United States Patent [19]

Paul

[11] Patent Number: 4,773,480

[45] Date of Patent: Sep. 27, 1988

[54] METHOD FOR SELECTIVELY PLUGGING DEEP SUBTERRANEAN FORMATIONS WITH POLYSULFIDES

[75] Inventor: James M. Paul, Desoto, Tex.

[73] Assignee: Mobil Oil Corporation, New York, N.Y.

[21] Appl. No.: 105,436

[22] Filed: Oct. 7, 1987

[51] Int. Cl.4 .................. E21B 33/138; E21B 43/24
[52] U.S. Cl. .................. 166/268; 166/288; 166/292
[58] Field of Search ............ 166/268, 288, 292, 294

[56] References Cited

U.S. PATENT DOCUMENTS

| | | | |
|---|---|---|---|
| 978,359 | 12/1910 | Cooper | 166/288 |
| 2,543,868 | 3/1951 | Prokop . | |
| 3,244,230 | 4/1966 | Sharp . | |
| 3,275,077 | 9/1966 | Smith et al. | 166/288 |
| 3,302,715 | 2/1967 | Smith et al. | 166/288 |
| 3,333,636 | 8/1967 | Groves, Jr. | 166/288 |
| 3,376,931 | 4/1968 | Messenger . | |
| 3,437,144 | 4/1969 | Fisher | 166/288 |
| 3,438,439 | 4/1969 | Froning . | |
| 3,669,188 | 6/1972 | Coles et al. | 166/288 X |
| 4,564,069 | 1/1986 | Rubinstein et al. | 166/288 |

OTHER PUBLICATIONS

"Polysulfide Stops FCCU Corrosion," by E. F. Ehmke, Hydrocarbon Processing, Jul. 1981, pp. 149–155.

*Primary Examiner*—George A. Suchfield
*Attorney, Agent, or Firm*—Alexander J. McKillop; Michael G. Gilman; Lawrence O. Miller

[57] ABSTRACT

Improved vertical and/or horizontal sweep efficiency in a deep subterranean oil containing formation having a temperature in excess of 250° F. containing relatively high permeability zones and relatively low permeability zones is obtained by injecting an aqueous polysulfide solution into the formation that preferentially enters the relatively high permeability zones and allowing the aqueous polysulfide solution in the relatively high permeability zones to disproportionate under the temperature conditions within the relatively high permeability zones to form a precipitate of elemental sulfur in situ which plugs the relatively high permeability zones in the formation. Thereafter, improved sweep efficiency is realized in displacing oil from the lesser permeable zones.

5 Claims, No Drawings

METHOD FOR SELECTIVELY PLUGGING DEEP SUBTERRANEAN FORMATIONS WITH POLYSULFIDES

FIELD OF INVENTION

This invention relates to a method for improving the vertical and/or horizontal sweep efficiency of a deep subterranean oil containing formation having a temperature in excess of 250° F. by selectively plugging the relatively high permeability zones in the formation by injecting an aqueous solution of polysulfides into the formation which preferentially enters the relatively highly permeable zones and allowed to undergo disproportionation under the temperature conditions within the relatively highly permeable zones to form a precipitate of elemental sulfur in situ which plugs the relatively high permeability zones.

BACKGROUND OF THE INVENTION

A variety of supplemental recovery techniques have been employed in order to increase the recovery of viscous oil from subterranean viscous oil containing formations. These techniques include thermal recovery methods, waterflooding and miscible flooding.

Heterogeneous hydrocarbon containing subterranean formations, i.e., formations having relatively high permeability zones and relatively lesser permeability zones, are difficult to efficiently flood by secondary and/or tertiary oil recovery processes because fluids preferentially migrate into the highly permeable zones in the subterranean formations. Migration described above is undesirable when injecting treatment fluids into oil-containing formations for the recovery oil since the treatment fluids channel through the highly permeable zones bypassing the less permeable zones. The result is poor conformance and flow profiles of the treatment fluid in the formation. The hydrocarbons residing in the less permeable zones are not produced and the overall yield of hydrocarbons from the formation is reduced.

To increase the efficiency of formation flooding processes, the highly permeable zones in a subterranean formations are plugged or partially plugged to prevent or reduce migration of treatment fluids into them and to divert treatment fluids into adjacent, less permeable zones. In injection profile control projects, polymeric materials have been used in liquid slurries or suspensions to effectively enter and plug or partially plug the highly permeable and/or fractured zones of the formation. Fluids injected after such a treatment therefore move into upswept areas or zones of the reservoir which results in increased oil recovery.

Particularly attractive plugging agents include high molecular weight polymers such as polyacrylamides, polysaccharides and/or cellulosic polymers with multivalent metal ions and crosslinked products thereof. Many deep, hot reservoirs in the North Sea and Middle East are too hot for using conventional organic polymers, such as polyacrylamides and polysaccharides. Polysilicates and modified polyacrylamides may be used at moderate temperatures, but due to their fast gelling characteristics only limited injection is feasible. In addition, these polymers are affected by salinity and temperature extremes and are eventually rendered ineffective by chemical and thermal degradation.

U.S. Pat. No. 3,244,230 discloses a method for reducing the permeability of a deep permeable subterranean formation penetrated by a well by introducing into the formation through the well an aqueous solution of sodium silicate and urea. The aqueous solution of the sodium silicate and the urea react under the temperature conditions within the subterranean formation to form a hydrogel of silica that reduces the permeability of the formation.

U.S. Pat. No. 3,438,439 discloses a method of plugging formations having a sour gas cap containing hydrogen sulfide by forming elemental sulfur at the location in the formation where the plug or pancake is desired. An aqueous solution of sulfur dioxide is injected at the gas-oil interface which reacts with the hydrogen sulfide to form a layer of free sulfur.

U.S. Pat. No. 3,376,931 discloses a method for removing elemental sulfur from sour reservoir containing hydrogen sulfide gas and free sulfur using aqueous solutions of ammonium sulfide that dissolve the free sulfur. Removing the sulfur prevents sulfur precipitates from reducing the permeability of the formation, particularly adjacent the production well.

In my copending application Ser. No. 105,435, (docket no. 4503), filed Oct. 7, 1987, there is disclosed a method for selectively plugging the relatively highly permeable zones of a subterranean oil-containing formation having a neutral to alkaline pH by initially injecting an aqueous acid solution into the relatively high permeable zones that lowers the pH of the relatively highly permeable zones to about 6 or less. Next, an aqueous polysulfide solution is injected into the relatively highly permeable zones and allowed to undergo disproportionation under the pH conditions within the relatively highly permeable zones to form a precipitate of elemental sulfur in situ that plugs the relatively highly permeable zones in the formation. Thereafter, improved sweep efficiency is realized in displacing oil from the lesser permeable zones. If the pH of the relatively high permeable zones in the formation is about 6 or less, the initial treatment with the aqueous acid solution is unnecessary.

In the process of my invention I take advantage of the fact that the temperatures prevailing in the deep subterranean formation penetrated by a well are sufficient, in excess of 250° F., to form a precipitate of elemental sulfur in situ from an injected aqueous solution of polysulfides which plugs the relatively highly permeable zones of the formation. Subsequently, injected displacing fluids are diverted into less permeable zones, facilitating recovery of hydrocarbons therein.

SUMMARY OF THE INVENTION

The present invention provides a method for improving the vertical and/or horizontal sweep efficiency of a deep subterranean oil-containing formation having a temperature in excess of about 250° F. and having relatively high permeability zones and relatively low permeability zones, the formation penetrated by at least one injection well and one spaced apart production well in fluid communication with the formation, comprising injecting an aqueous polysulfide solution, preferably ammonium polysulfide or ethylamine polysulfide, into the formation via the injection well that preferentially enters the relatively high permeability zones and allowing the aqueous polysulfide solution to undergo disproportionation under the temperature conditions within the relatively high permeability zones to form a precipitate of elemental sulfur in situ which plugs the high permeability zones of the formation to obtain the improved vertical and/or horizontal sweep efficiency.

DESCRIPTION OF THE PREFERRED EMBODIMENTS

The present invention provides a method for improving the vertical and/or horizontal sweep efficiency of a deep subterranean oil-containing formation having a temperature in excess of 250° F. and having relatively high permeability zones and relatively lower permeability zones. The invention is especially useful with secondary and tertiary recovery processes wherein a displacing fluid is used to displace oil from a subterranean, oil-containing formation penetrated by at least one injection well and a spaced-apart production well in fluid communication with the formation. The displacing fluid can be any fluid which effectively displaces crude oil from the formation, e.g., it can be an immiscible, miscible or miscible-like displacing fluid. The displacing fluid is injected into the injection well to displace oil through the formation toward the production well from which oil is recovered.

The present invention is based upon the use of dissolved sulfur in the form of aqueous polysulfide anions that are capable under formation temperatures in excess of 250° F. of undergoing disproportionation to form a precipitate of elemental sulfur. Ammonium sulfide or ethylamine, for example, are capable of reacting with 8 to 9 moles of elemental sulfur to form ammonium polysulfide or ethylamine polysulfide respectively. The ammonium sulfide and sulfur reaction would be as follows:

$$(NH_4)_2S + 3S \rightarrow (NH_4)_2S_4$$

Ammonium polysulfide or ethylamine polysulfide aqueous solutions are stable at room temperature and at moderate pH values. However, aqueous polysulfide solutions of these compounds are not stable under acidic conditions, a pH of about 6 or less, or high temperature conditions in excess of 250° F., which cause disproportionation to form a precipitate of elemental sulfur. For example, the disproportionate reaction for ammonium polysulfide under temperatures in excess of 250° F. would be as follows:

$$(NH_4)_2S_4 \xrightarrow[>250° F.]{\Delta} S\downarrow + (NH_4)_2S_3$$

In the present invention, the precipitation of the elemental sulfur from the aqueous polysulfide solution under formation temperature conditions is effective in plugging the relatively high permeability zones in the formation. Precipitated sulfur remains in solid form until approximately 248° F. when melting begins. With the onset of melting comes an increase in viscosity which resists displacement by injection of displacing fluids such as water, gas or steam. Solid sulfur or liquid sulfur in the pore space of the relatively high permeability zones of the formation is an effective blocking agent to fluids subsequently into the formation such as water, gas or steam.

In accordance with the present invention an aqueous solution of polysulfides, preferably ammonium polysulfide or ethylamine polysulfide, is injected into the formation via the injection well that preferentially enters the relatively highly permeable zones in the formation. The concentration of polysulfides in an aqueous soluton is determined by the amount of precipitation of sulfur desired, and can vary from 20 wt.% to 70 wt.%. After the desired amount of aqueous polysulfide solution has been introduced into the formation via the injection well, the solution is allowed to remain in the relatively highly permeable zones of the formation for a sufficient period of time to disproportionate under the temperature conditions within the relatively highly permeable zones to precipitate elemental sulfur in situ which plugs the relatively highly permeable zones. This period of time for disproportionation will vary depending upon the temperature of the formation in excess of 250° F. After the desired amount of plugging has been obtained, improved sweep efficiency is realized in displacing oil from the formation by subsequently injected fluids. Displacing fluids such as water, gas or steam subsequently injected into the formation via the injection well are diverted into less permeable zones containing oil that is displaced through the formation toward the production well from which oil is recovered.

Aqueous polysulfide solutions may be prepared by reacting elemental sulfur in an ammonium sulfide solution (20–70 wt. percent) or in concentrated ammonium hydroxide in the presence of hydrogen sulfide. The proportions of sulfide and sulfur are adjusted to fit the conditions of the reservoir including porosity and permeability. Polysulfides may also be prepared in shear-thinning solutions of polysaccharides and polyacrylamides for aid in selective injection. Even though conventional polymers would degrade under high temperature, the benefit of selectively introducing the polysulfides in the formation would be justified additional cost.

The volume amount of the aqueous polysulfide solution injected into the relatively high permeability zones of the oil-containing formation is dependent upon formation characteristics and the degree of plugging or partial plugging desired. Accordingly, the extent to which the permeability of the formation is reduced can be controlled as desired. Preferably, the quantity of the aqueous polysulfide solution required is that amount sufficient to extend into the relatively highly permeable zones a distance equal to at least five to thirty percent of the pore volume of the highly permeable zones between the injection well and the production well. This amount will vary depending upon the porosity, thickness and oil and water saturation of the formation. Placement of the aqueous polysulfide solution into a particular strata of the formation may be accomplished by packing off the zone of interest by mechanical means such as packers, chokes and injection strings, etc., or by selective injection of chemicals due to natural differences in the reservoir rock.

By the term "pore volume" as used herein is meant that volume of the portion of the formation underlying the well pattern employed as described in greater detail in U.S. Pat. No. 3,927,716 to Burdyne et al, the disclosure of which is hereby incorporated by reference.

From the foregoing specification one skilled in the art can readily ascertain the essential features of this invention and without departing from the spirit and scope thereof can adapt it to various diverse applications. It is my intention and desire that my invention be limited only by those restrictions or limitations as are contained in the claims appended immediately hereinafter below.

I claim:

1. A method for improving the vertical and/or horizontal sweep efficiency of a deep subterranean oil-containing formation having a temperature in excess of 250° F. and having relatively high permeability zones and relatively low permeability zones, the formation being penetrated by at least one injection well and a spaced-apart production well in fluid communication with the formation, the method comprising:

(a) injecting an aqueous polysulfide solution into the formation via the injection well that preferentially enters the relatively high permeability zones; and (b) allowing the aqueous polysulfide solution in the relatively high permeability zones to undergo disproportionation under the temperature conditions within the relatively high permeability zones to form a precipitate of elemental sulfur in situ which plugs the relatively high permeability zones to obtain the improved vertical and/or horizontal sweep efficiency.

2. A method according to claim 1 wherein the polysulfide is ammonium polysulfide.

3. A method according to claim 1 wherein the polysulfide is ethylamine polysulfide.

4. A method according to claim 1 wherein the aqueous polysulfide solution contains 20 to 70 weight percent of polysulfide.

5. A method according to claim 1 wherein the amount of aqueous polysulfide solution injected into the formation is sufficient to extend into the relatively high permeability zones a distance equal to at least five to thirty percent of the pore volume of the high permeability zones of the formation between the injection well and the production well.

* * * * *